(12) United States Patent
Cewers (10) Patent No.: US 8,393,228 B2
(45) Date of Patent: Mar. 12, 2013

(54) METHOD AND SYSTEM FOR MEASURING A FLOW

(75) Inventor: Göran Cewers, Limhamn (SE)

(73) Assignee: Mindray Medical Sweden AB, Sundbyberg (SE)

( * ) Notice: Subject to any disclaimer, the term of this patent is extended or adjusted under 35 U.S.C. 154(b) by 207 days.

(21) Appl. No.: 13/108,779

(22) Filed: May 16, 2011

(65) Prior Publication Data

US 2011/0283772 A1 Nov. 24, 2011

Related U.S. Application Data

(60) Provisional application No. 61/345,771, filed on May 18, 2010.

(51) Int. Cl.
*G01F 1/37* (2006.01)
(52) U.S. Cl. .................................................. 73/861.52
(58) Field of Classification Search ............... 73/861.52, 73/861, 861.53, 861.22, 202.5
See application file for complete search history.

(56) References Cited

U.S. PATENT DOCUMENTS

| | | | |
|---|---|---|---|
| 3,196,680 A | | 7/1965 | Curran |
| 4,142,407 A | * | 3/1979 | Kuroiwa et al. ............ 73/114.35 |
| 4,381,668 A | * | 5/1983 | Sato et al. ..................... 73/202.5 |
| 5,265,594 A | | 11/1993 | Olsson et al. |
| 5,723,783 A | * | 3/1998 | Woodward ....................... 73/203 |
| 6,164,141 A | | 12/2000 | Chalvignac et al. |
| 6,247,495 B1 | * | 6/2001 | Yamamoto et al. ...... 137/599.13 |
| 8,161,970 B2 | * | 4/2012 | Cewers .................... 128/204.21 |
| 8,230,857 B2 | * | 7/2012 | Cewers .................... 128/204.21 |
| 2002/0046612 A1 | | 4/2002 | Mudd |
| 2007/0283962 A1 | | 12/2007 | Doshi et al. |
| 2009/0064794 A1 | | 3/2009 | Bonassa |

FOREIGN PATENT DOCUMENTS

SE 529989 C2 1/2008

* cited by examiner

*Primary Examiner* — Jewel V Thompson
(74) *Attorney, Agent, or Firm* — Kory D. Christensen; Stoel Rives LLP (57) ABSTRACT

A method is described for measuring a flow of gas passing a flow meter device. The device causes a pressure drop when a gas flows through it. The pressure drop across the device is a measure of the gas flow. The device is configured as a gas permeable tube that has a flow channel on the upstream side along the tube configured so as to decrease the cross-section of the channel downstream of the gas permeable tube. This provides for a minimum volume in the channel upstream of the device's pressure-drop-generating component.

16 Claims, 7 Drawing Sheets

METHOD AND SYSTEM FOR MEASURING A FLOW

CROSS-REFERENCE TO RELATED APPLICATION(S)

This application claims the benefit of U.S. Provisional Application No. 61/345,771, filed May 18, 2010, which is incorporated herein by reference.

TECHNICAL FIELD

The disclosure relates to flow measurement.

SUMMARY OF THE INVENTION

A system and method for flow measurement using a flow restrictor are disclosed.

DETAILED DESCRIPTION

Various methods for measuring a flow by means of a flow restrictor are known for liquids and gases, e.g., in flow regulators for ventilators. Examples of ventilator applications are disclosed in U.S. Pat. No. 5,265,594 and Swedish Patent No. 529,989. U.S. Pat. No. 5,265,594 discloses how a flow restrictor is used for measuring gas flow through a gas channel upstream of a control valve. Swedish Patent No. 529,989 discloses how a flow restrictor is used for measuring gas flow through a gas channel downstream of a control valve.

One important difference between gases and liquids in flow measurement is that gases are compressible and liquids are virtually uncompressible. This results in a number of undesirable effects, such as the pressure in the gas channel affecting the flow measurement, since a change in pressure results in a pressure-generated flow flowing directly into the volume between the flow restrictor and a control valve that generates or controls a flow based on the flow signal from the flow meter.

Should the flow restrictor be located upstream of the control valve, false flows will be generated by pressure variations in the outlet to the device. In a ventilator application, this means that valves comprising a plurality of such aggregates with a common outlet will interfere with each other.

One way of minimizing undesired gas compression effects is to make the volume between the flow restrictor and the control valve as small as possible, which can be done by using a small flow restrictor. However, this is done at the expense of the linearity and dynamics of the flow pressure drop versus the flow due to increased turbulence at high flows.

In one aspect of the disclosure, a method is described for measuring a flow of a gas passing a flow meter device. The device causes a pressure drop when a gas flows through it. The pressure drop across the device is a measure of the gas flow. In one embodiment, the device is configured as a gas permeable tube, which has a flow channel on the upstream side along the tube configured to decrease the cross-sectional area of the channel downstream of the gas permeable tube. A small volume is produced by adapting the device flow channel and flow restriction to the geometry of the flow profile of the gas flowing out from the flow valve. This provides for a minimum volume in the channel upstream of the device's pressure-drop-generating component.

In some embodiments, the outlet from a gas valve is centered, and the outlet flow profile has the appearance of a jointed cone. In other cases, the outlet is coaxial with a flow profile that may be described as a tube.

By designing the geometry of the device according to the above-mentioned flow profiles, it is possible to make a flow restrictor for each of the mentioned valve types.

In another aspect, a flow meter element is provided comprising a tube element and a flow restrictor arranged inside the tube element. The tube element may comprise a connection interface to a flow valve. The flow restrictor may comprise a closed fluid permeable body so as to form a fluid permeable tube, which, on the upstream side, along the tube, has a flow channel configured to decrease the cross-section of the flow channel downstream of the tube.

In one embodiment, the tube element is an outer tube. The outer tube and the fluid permeable body are arranged relative to each other at a distance which decreases along the direction of the flow meter element between the inner side of the outer tube and the fluid permeable body.

By adapting the flow meter element's flow channel and the flow restrictor to the geometry of the flow profile from a fluid flowing out from a flow valve, it is possible to obtain a relatively large surface in the flow restrictor and, at the same time, a small volume between the flow restrictor and the interface (outer tube) to a valve. An increased pressure is generated upstream before the flow restrictor, e.g., by compressing a gas when flow resistance increases, and a pressure drop downstream of the flow restrictor. The pressure differential is proportional to the flow in the channel, allowing the flow to be measured.

In one embodiment of the flow meter element, the closed fluid permeable body is a cone. A way of creating the above-mentioned design is for the fluid permeable body to be conical in shape turned either upstream or downstream.

In another embodiment, the closed fluid permeable body is a partial cone. A way of creating the abovementioned design is for the fluid permeable body to be partly conical in shape turned either upstream or downstream.

The cross-section of the tube geometry of the outer tube and the fluid permeable tube may either be of a circular shape, a polygonal shape, or an ellipsoid shape.

In some embodiments of the disclosure, the flow meter element comprises a differential pressure meter, which is connected to each side of the fluid permeable body. The differential pressure meter measures the differential pressure on both sides of the fluid permeable body, which is then used to calculate the flow.

Some embodiments of the disclosure comprise the flow meter element having a flow valve that is connected to a first connection interface to the flow meter element.

Some embodiments of the disclosure comprise the flow meter element having a second connection interface identical to the flow valve's connection interface.

By the flow meter element having a mechanical connection interface adapted after a closed flow valve and a flow meter element having a second connection interface identical to that of the flow valve, the device can be coupled into a link with an already existing design.

Another aspect of the disclosure includes a flow measurement method comprising a flow restrictor with a relatively large surface and a relatively small volume between the fluid permeable body placed in the flow channel of the flow restrictor and the outer tube of the connection interface, wherein the relatively small volume is provided by the outer tube and the fluid permeable body is arranged at a relative distance from the outer tube, which decreases along the longitudinal direction of the flow meter element between the inside of the outer tube and the fluid permeable body, thus boosting the pressure upstream and producing a pressure drop downstream of the fluid permeable body, the difference between which is proportional to the flow.

Yet another aspect of the disclosure provides a method for measuring a flow, which comprises measuring the flow of a fluid passing a flow meter device, wherein the device causes a pressure drop in the fluid flowing through it, and where the pressure drop across the device is a measure of the fluid flow. The method comprises providing a device that is configured as a fluid permeable tube, which on the upstream side along the tube, has a flow channel which is configured so that the cross-sectional area of the channel decreases downstream of the fluid permeable tube, whereby this method comprises providing a minimal volume in the channel upstream of the device's pressure-drop-generating part.

Using the above described method, the flow in a flow channel or out of a valve may be measured easily without the occurrence of false flows, which might affect flow measurement.

Figure 1:
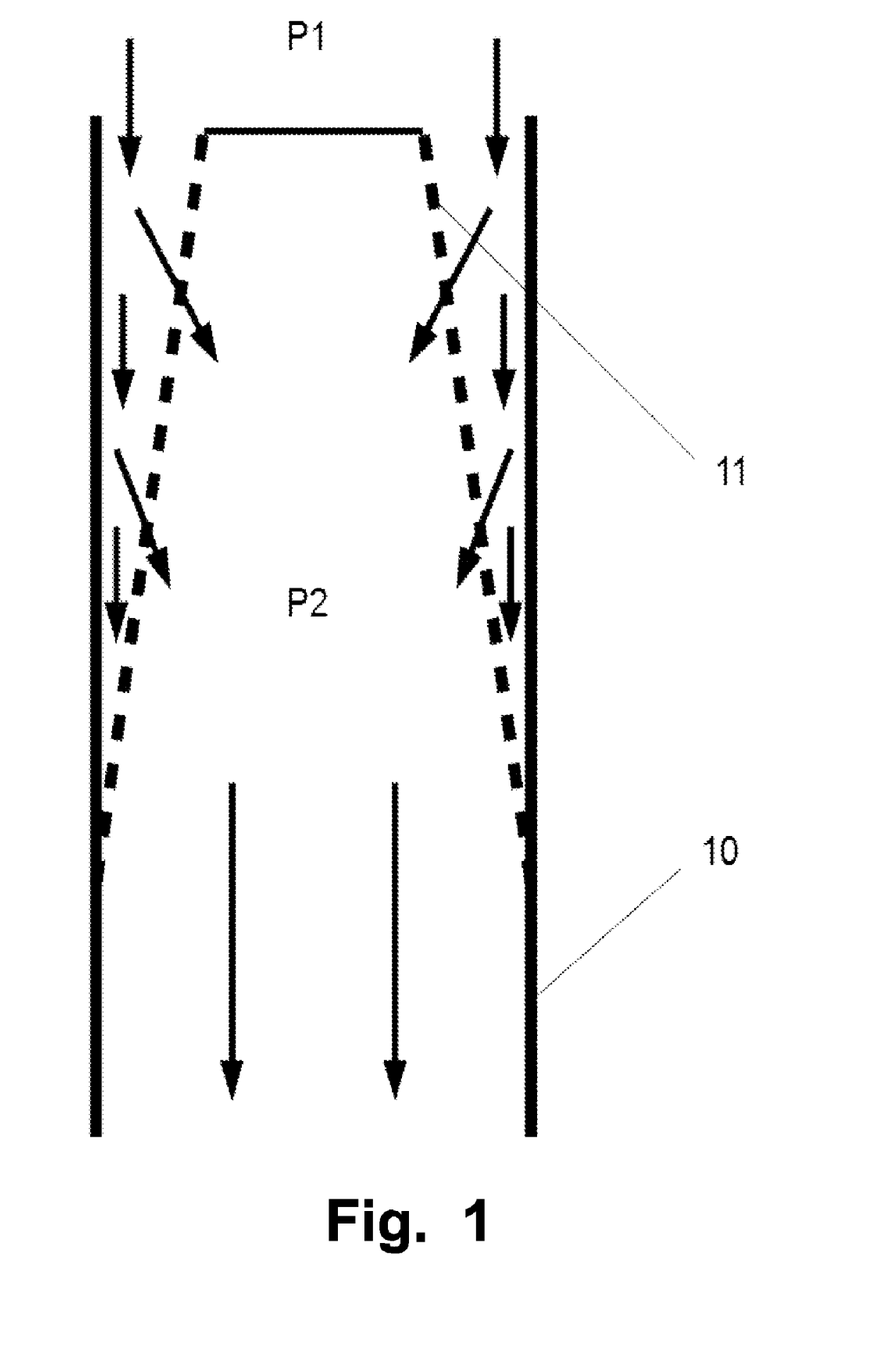
FIGS. 1 and 2 are schematic views of exemplary embodiments suitable for a flow valve with a peripheral circular outlet upstream.

An exemplary embodiment of a device is shown in FIG. 1 by a gas flow from a flow valve flowing in the inside of a tube 10 and passing downstream through a gas permeable partial cone 11. Due to the shape of cone 11, the cross-sectional area of the flow channel gradually decreases downstream of cone 11. In this manner turbulence is decreased, as well as the volume between cone 11 and inlet upstream of tube 10. A pressure P1 builds up upstream the cone, depending on the flow. Pressure P2 is measured downstream the cone. The difference between P2 and P1 (P2–P1) is a measure of the flow.

Flow measurement is possible, in one embodiment, due to minimum turbulence and the minimal volume between cone 11 and the inlet upstream of tube 10. Thus flow measurement is largely independent of pressure variations in the flow channel. The signal from the differential pressure P2-P1 provides rapid and reliable gas flow control with a flow valve.

The device shown in FIG. 1 is suitable for a flow valve with an upstream peripheral circular outlet. For example, the flow valve can be fastened to the flow meter using a suitable flange (not shown) or using grooves which close on seals, see, for example, FIG. 8.

In some embodiments of the flow meter system, besides the differential pressure P2–P1, other parameters, such as gas temperature, outlet pressure P2, gas viscosity, and gas density, are measured. These parameters may be linearized. This allows flow to be calculated with extreme accuracy.

Figure 2:
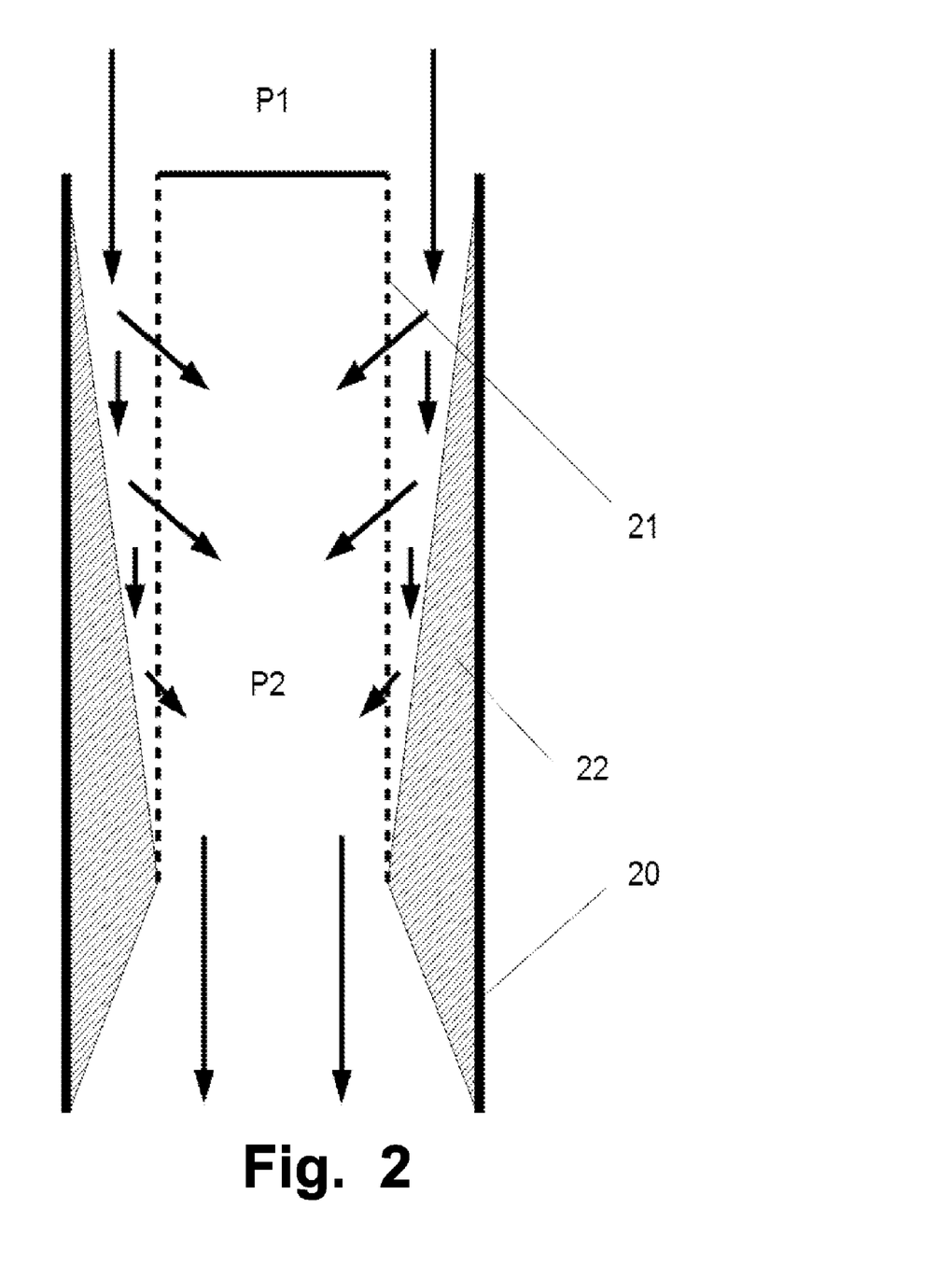

FIG. 2 shows a schematic view of yet another exemplary embodiment suitable for a flow valve with a peripheral circular outlet upstream. Tube 20 is similar to tube 10 of FIG. 1. In this embodiment, gas permeable element 21 is cylindrical in shape with a closed end upstream. The cross-section of the flow channel gradually decreases downstream due to insert 22 gradually decreasing the cross-sectional area of the flow channel up to the fastening point of the cylindrical gas permeable element 21.

Figure 5:
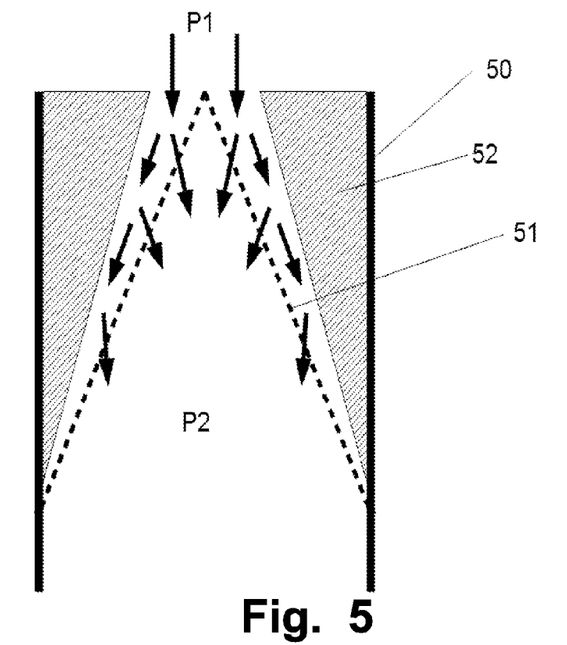
FIG. 5 is a schematic view of an exemplary embodiment suitable for a flow valve with a centered outlet upstream.
Figure 6:
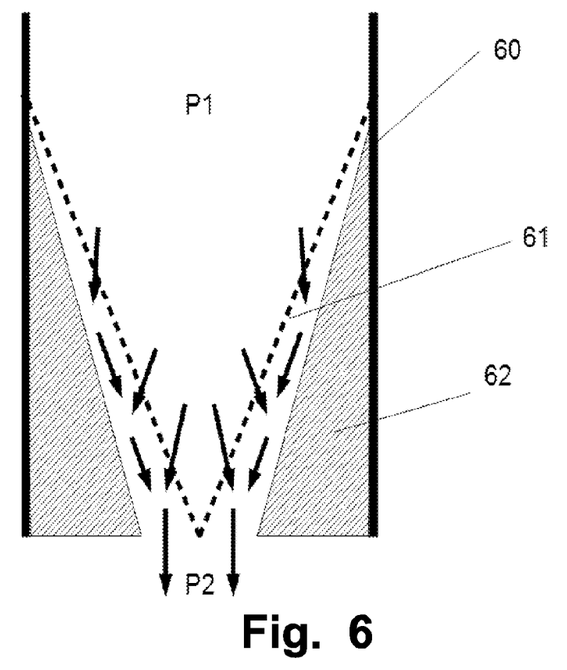
FIG. 6 is a schematic view of an exemplary embodiment suitable for a flow valve downstream with a centered inlet.

In other embodiments, a conical gas permeable element may be combined with a conical insert, see, e.g., FIGS. 5 and 6. The tube and the insert may be configured as an integrated component.

Figure 3:
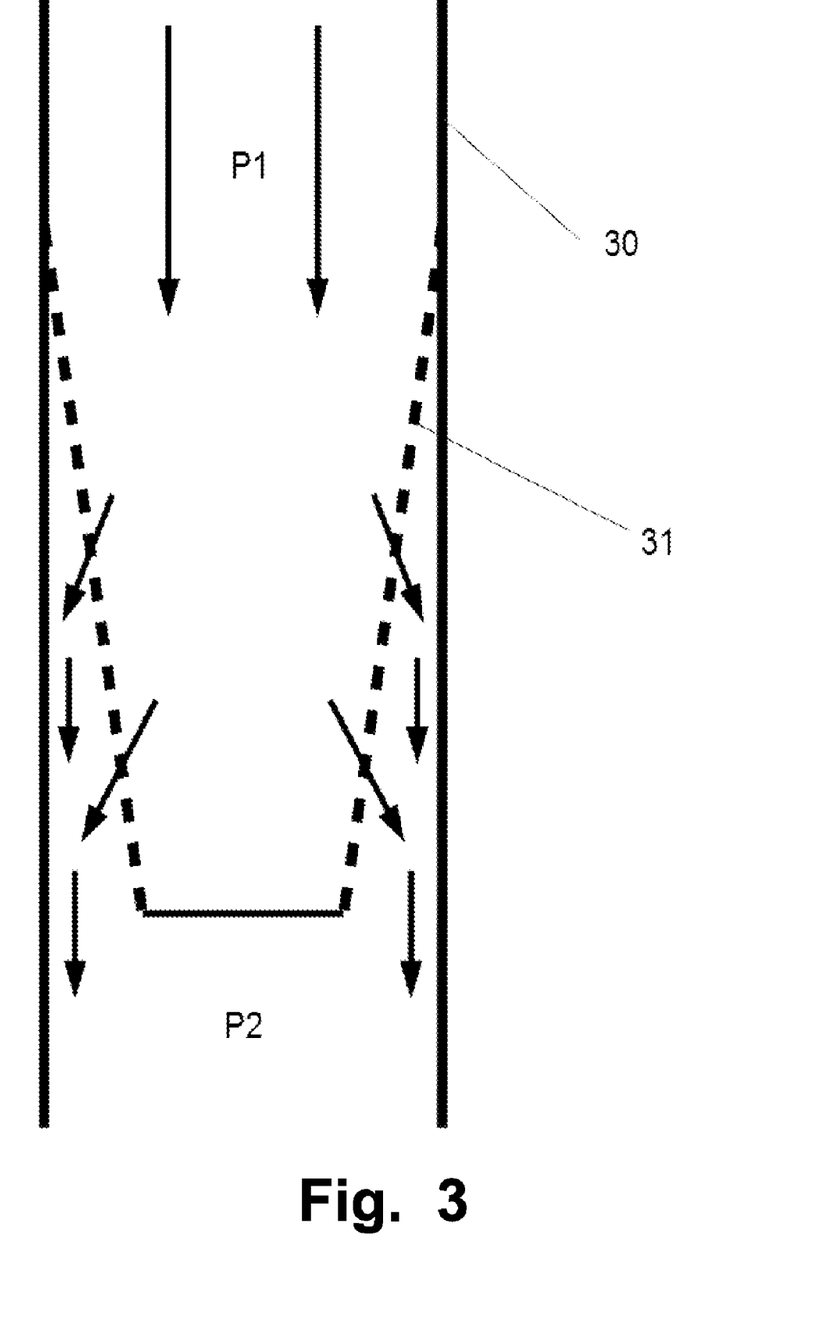
FIGS. 3 and 4 are schematic views of exemplary embodiments suitable for a flow valve downstream with a peripheral circular inlet.

FIG. 3 shows a schematic view of an exemplary embodiment suitable for a flow valve downstream with a peripheral circular inlet. In one embodiment, a conical gas permeable element 31 is arranged in a tube 30. Here too, the distance in longitudinal direction of the flow meter element between the inside of the outer tube and the fluid permeable body is changed.

Figure 4:
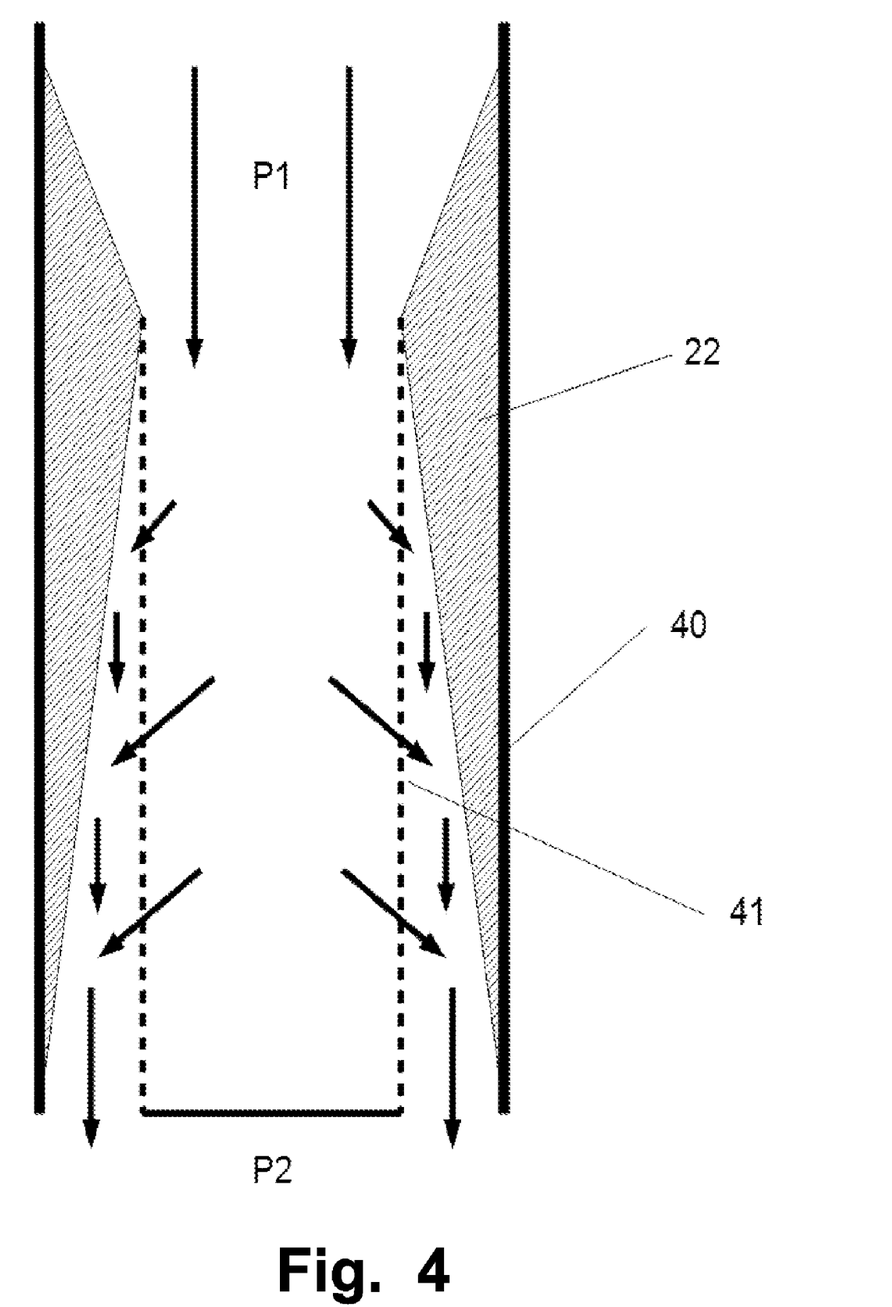

FIG. 4 shows a schematic view of yet another exemplary embodiment suitable for a flow valve downstream with a peripheral circular inlet. Tube 40 is similar to tube 21 in FIG. 1. In this embodiment, a gas permeable element 41 is cylindrical in shape with a closed end downstream. Here, too, the distance in longitudinal direction of the flow meter element between the inside of the outer tube and the fluid permeable body is changed.

FIG. 5 shows a schematic view of an exemplary embodiment suitable for a flow valve with a centered outlet upstream. Tube 50 is similar to tube 10 in FIG. 1. A conical gas permeable element 51 is combined with a conical insert 52, but the pitch of the two elements differs. The conical gas permeable element 51 has a larger pitch than conical insert 52. In this manner, an extremely small volume is provided between the device's flow restrictor and the interface to a control valve.

FIG. 6 shows a schematic view of an exemplary embodiment suitable for a flow valve downstream with a centered inlet. Tube 60 is similar to tube 10 in FIG. 1. A conical gas permeable element 61 is combined with a conical insert 62, but the pitch of the two elements may differ. The conical gas permeable element 61 may have a lower pitch than the conical insert 62. In this manner, an extremely small volume is provided between the device's flow restrictor and the interface to the control valve.

Figure 7:
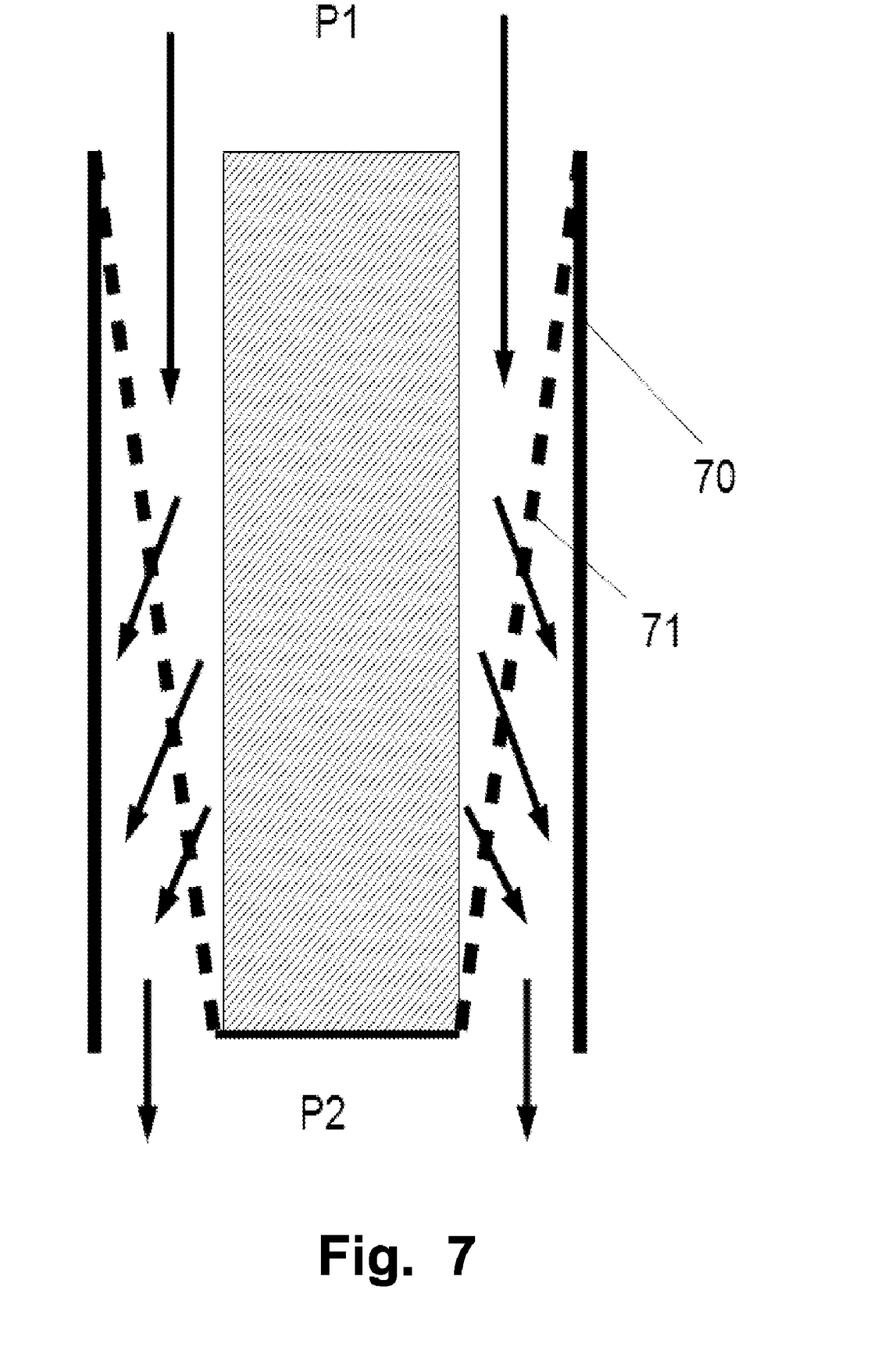
FIG. 7 is a schematic view of an exemplary embodiment suitable for a flow valve upstream with a peripheral circular outlet.

FIG. 7 shows in a schematic view an exemplary embodiment suitable for a flow valve with a peripheral circular outlet upstream. Tube 70 is similar to tube 10 in FIG. 1. In this embodiment, a conical gas permeable element 71 is combined with a cylindrical insert. Here, too, the distance in longitudinal direction of the flow meter element between the inside of the outer tube and the fluid permeable body is changed so there is an extremely small volume between the device's flow restrictor and the interface with the control valve.

Figure 8:
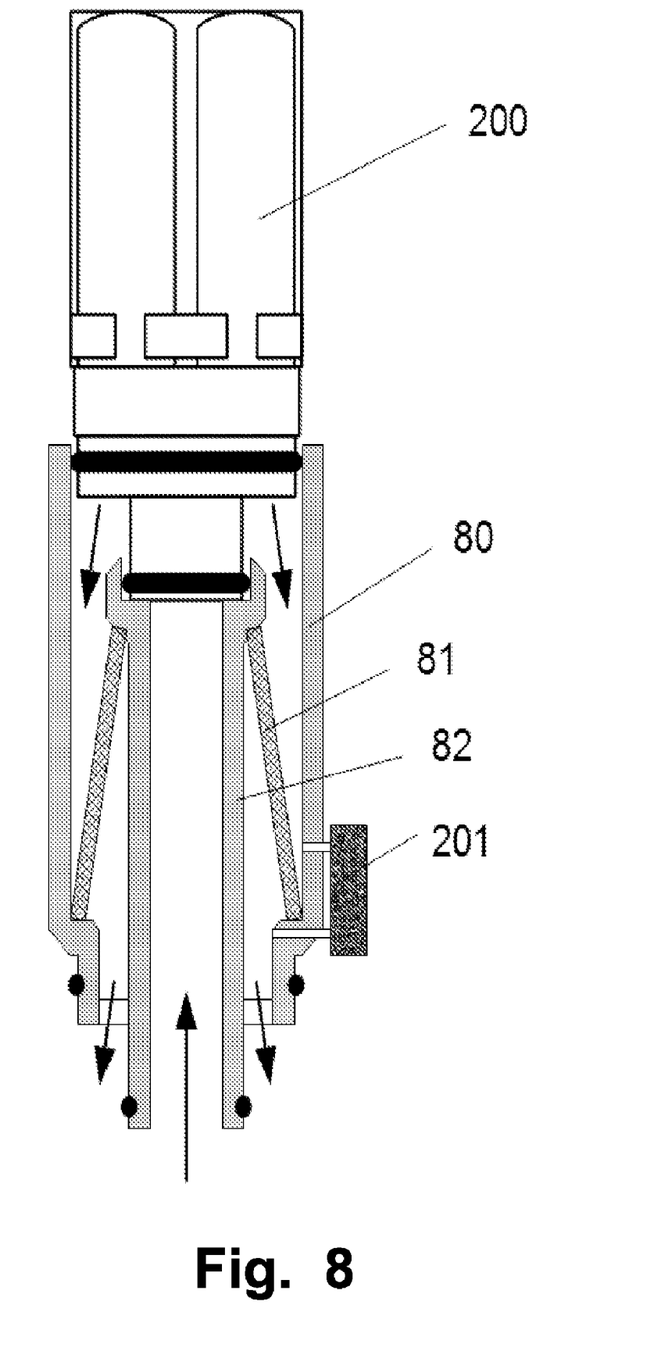
FIG. 8 is a schematic view of an exemplary embodiment of a flow valve upstream with a peripheral circular outlet.

In FIG. 8, an exemplary embodiment is shown where a valve 200 with central inlet and coaxial outlet is connected to the device. Tube 80 is similar to tube 10 in FIG. 1. In this embodiment, the device shown in the figure has a mechanical interface to the valve that fits together with the valve's interface. The device interface shown at the bottom of the figure is identical with the valve's interface. This allows the device to be connected as a link in an existing design. The differential pressure sensor 201 has ports on each side of a cone 81 of gas permeable material. The gas flow may be measured with the help of the signal emitted by this sensor. FIG. 8 also shows a tube/conduit 82 connected to the inlet.

In this embodiment, the parts used are circular. However, the geometry of the device is not restricted to these shapes. The circular shape can be replaced by polygons, ellipses, or combinations thereof.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. The scope of the invention is, therefore, defined by the following claims. The words "including" and "having," as used herein, including the claims, shall have the same meaning as the word "comprising."

What is claimed is:

1. A flow meter element comprising a tube element and a flow restrictor arranged inside the tube element, wherein said tube element comprises a connection interface to a flow valve, and wherein the flow restrictor comprises a closed fluid permeable body so as to form a fluid permeable tube, which, on an upstream side along the tube, has a flow channel configured to decrease a cross-section of the flow channel downstream of said tube.

2. The flow meter element of claim 1, wherein said tube element is an outer tube; and wherein said outer tube and said fluid permeable body are arranged relative to each other at a distance that decreases along a longitudinal direction of the flow meter element between an inner side of the outer tube and the fluid permeable body.

3. The flow meter element of claim 1, wherein the fluid permeable body is shaped as a tube with one closed end.

4. The flow meter element of claim 3, wherein said flow channel downstream of said closed tube has a gradually decreasing cross-sectional area.

5. The flow meter element of claim 1, wherein said flow channel upstream of said closed tube has a gradually decreasing cross-sectional area.

6. The flow meter element of claim 3, wherein said closed fluid permeable body is a cone.

7. The flow meter element of claim 1, wherein said tube element comprises an insert element that conically changes the flow channel.

8. The flow meter element of claim 3, wherein the closed fluid permeable body is a partial cone.

9. The flow meter element of claim 1, wherein the cross-section of the tube geometries is of circular shape, polygonal shape, or ellipsoid shape.

10. The flow meter element of claim 1, wherein a cross-section of the tube geometries is a combination of a circular shape, and/or a polygonal shape, and/or an ellipsoid shape.

11. The flow meter element of claim 1, comprising a differential pressure meter that is connected to each side of the fluid permeable body, and is arranged to measure a differential pressure upon a flow across the fluid permeable body.

12. The flow meter element of claim 1, comprising a flow valve that is connected to a first connection interface to said flow meter element.

13. The flow meter element of claim 12, wherein said flow meter element has a second connection interface identical to said flow valve's connection interface.

14. A flow meter element comprising a flow restrictor with a relatively large surface and a relatively small volume between the fluid permeable body placed in the flow channel of the flow restrictor and the outer tube of the connection interface; wherein the relatively small volume is provided by the outer tube and the fluid permeable body being arranged at a relative distance from one another that decreases along the longitudinal direction of the flow meter element between the inside of the outer tube and the fluid permeable body, thereby boosting the pressure upstream and producing a pressure drop downstream of the fluid permeable body, the difference between which is proportional to the flow.

15. A method of measuring a flow of a fluid passing a flow meter device, wherein the device causes a pressure drop in the fluid flowing through it, and where the pressure drop across the device is a measure of the fluid flow, and wherein the method comprises providing a device that is configured as a fluid permeable tube, which, on an upstream side along the tube, has a flow channel that is configured so that the cross-sectional area of the channel decreases downstream of the fluid permeable tube, whereby said method comprises providing a minimal volume in the channel upstream of a pressure-drop-generating part of the device.

16. The method of claim 15, comprising measuring differential pressure, gas temperature, outlet pressure, gas viscosity, and gas density, for determining the flow.

* * * * *